(12) United States Patent
Lee

(10) Patent No.: US 9,397,965 B2
(45) Date of Patent: Jul. 19, 2016

(54) CONVERSATIONAL MESSAGE SERVICE OPERATING METHOD FOR PROVIDING ACKNOWLEDGEMENT

(71) Applicant: Daum Kakao Corp., Jeju-si, Jeju-do (KR)

(72) Inventor: Sang Hyuk Lee, Yongin-si (KR)

(73) Assignee: Kakao Corp., Jeju-si, Jeju-do (KR)

( * ) Notice: Subject to any disclaimer, the term of this patent is extended or adjusted under 35 U.S.C. 154(b) by 140 days.

(21) Appl. No.: 13/878,176

(22) PCT Filed: Sep. 21, 2012

(86) PCT No.: PCT/KR2012/007593
§ 371 (c)(1),
(2) Date: Apr. 5, 2013

(87) PCT Pub. No.: WO2013/042985
PCT Pub. Date: Mar. 28, 2013

(65) Prior Publication Data
US 2013/0212202 A1    Aug. 15, 2013

(30) Foreign Application Priority Data
Sep. 22, 2011  (KR) .......................... 10-2011-0095674

(51) Int. Cl.
G06F 15/16      (2006.01)
H04L 12/58      (2006.01)
G06Q 10/10      (2012.01)

(52) U.S. Cl.
CPC .............. *H04L 51/04* (2013.01); *G06Q 10/107* (2013.01)

(58) Field of Classification Search
CPC ...................................................... H04L 51/04
USPC ........................................ 709/204, 205, 206
See application file for complete search history.

(56) References Cited

U.S. PATENT DOCUMENTS

| 4,953,159 | A  | * | 8/1990 | Hayden et al. ................. 370/265 |
| 5,617,561 | A  | * | 4/1997 | Blaauw et al. .................. 703/26 |
| 6,219,542 | B1 |   | 4/2001 | Aas et al. |
| 6,442,546 | B1 | * | 8/2002 | Biliris .................. G06Q 10/107 |

(Continued)

FOREIGN PATENT DOCUMENTS

| JP | 04167840 A | * | 6/1992 | .............. H04L 12/18 |
| JP | 10-200931  |   | 7/1998 | |

(Continued)

OTHER PUBLICATIONS

*The Financial Times*, "First-class business newspapers with in-depth insights for the global era," Apr. 24, 2011, 2 pages. (with Engl. Translation).

(Continued)

Primary Examiner — Karen Tang
(74) Attorney, Agent, or Firm — Gilberto M. Villacorta; Jihwang Yeo; Foley & Lardner LLP

(57) ABSTRACT

A method of operating a conversational messaging service may include assigning an identification number to messages transmitted by users participating in a group chat, sequentially, selecting an identification number of any one of messages associated with each of the users as a watermark of each of the users, and determining a number of users failing to read each of the each of the messages, based on the watermark of each of the users.

12 Claims, 6 Drawing Sheets

(56) References Cited

U.S. PATENT DOCUMENTS

| | | | |
|---|---|---|---|
| 6,654,791 B1* | 11/2003 | Bates | G06Q 10/107 709/206 |
| 6,845,391 B1* | 1/2005 | Aas et al. | 709/206 |
| 7,584,426 B2* | 9/2009 | Chang et al. | 715/257 |
| 7,673,002 B1* | 3/2010 | Damarla | G06Q 10/107 709/206 |
| 8,396,985 B2* | 3/2013 | Wu | 709/238 |
| 8,903,909 B1* | 12/2014 | Marra et al. | 709/204 |
| 2003/0055892 A1* | 3/2003 | Huitema et al. | 709/204 |
| 2003/0188001 A1* | 10/2003 | Eisenberg et al. | 709/229 |
| 2004/0039630 A1* | 2/2004 | Begole et al. | 705/11 |
| 2005/0053018 A1* | 3/2005 | Hoppe-Boeken et al. | 370/260 |
| 2005/0204385 A1* | 9/2005 | Sull et al. | 725/45 |
| 2005/0240656 A1* | 10/2005 | Blair | 709/213 |
| 2006/0010200 A1* | 1/2006 | Mousseau et al. | 709/204 |
| 2007/0008884 A1* | 1/2007 | Tang | 370/230 |
| 2007/0014428 A1* | 1/2007 | Kountchev et al. | 382/100 |
| 2007/0159985 A1* | 7/2007 | Sunell et al. | 370/254 |
| 2008/0301799 A1* | 12/2008 | Arnold et al. | 726/14 |
| 2009/0063637 A1* | 3/2009 | Sun | H04L 12/1831 709/206 |
| 2009/0147704 A1* | 6/2009 | Moore | 370/260 |
| 2009/0222402 A1* | 9/2009 | Tysowski | 707/1 |
| 2009/0268716 A1* | 10/2009 | Lamb | H04L 12/5885 370/352 |
| 2009/0290715 A1* | 11/2009 | Mityagin et al. | 380/278 |
| 2009/0327972 A1* | 12/2009 | McCann et al. | 715/853 |
| 2011/0029622 A1* | 2/2011 | Walker et al. | 709/206 |
| 2011/0051727 A1* | 3/2011 | Cai et al. | 370/390 |
| 2012/0120805 A1* | 5/2012 | Maze et al. | 370/235 |
| 2012/0162379 A1* | 6/2012 | Dahi et al. | 348/47 |
| 2012/0203893 A1* | 8/2012 | Williams et al. | 709/224 |
| 2013/0044583 A1* | 2/2013 | Chuang et al. | 370/216 |
| 2013/0057639 A1* | 3/2013 | Ralston | 348/14.02 |
| 2014/0032681 A1* | 1/2014 | Jain et al. | 709/206 |
| 2014/0058280 A1* | 2/2014 | Chefles et al. | 600/521 |
| 2014/0149522 A1* | 5/2014 | Mok et al. | 709/206 |
| 2015/0019990 A1* | 1/2015 | Peterson et al. | 715/745 |

FOREIGN PATENT DOCUMENTS

| | | |
|---|---|---|
| JP | 2003-333263 | 11/2003 |
| KR | 10-2006-0107369 A | 10/2006 |
| KR | 10-2008-0003983 A | 1/2008 |
| KR | 10-2008-0059756 A | 7/2008 |

OTHER PUBLICATIONS

International Search Report issued in related Korean International Patent Application No. PCT/KR2012/007593, dated Feb. 21, 2013.
Office Action mailed Aug. 5, 2014 in Japan Application No. 2013-534841.

* cited by examiner

CONVERSATIONAL MESSAGE SERVICE OPERATING METHOD FOR PROVIDING ACKNOWLEDGEMENT

TECHNICAL FIELD

The present invention relates to a method of operating a conversational messaging service for providing confirmation of receipt that allows users to verify whether messages occurring in a group chat are received by other users.

BACKGROUND ART

With a recent rise in distribution of mobile terminals, mobile terminals are now considered an essential item for modern life. Since, in addition to a voice call service unique to each portable terminal, a variety of data transmission services and various additional services are being made available via mobile terminals, mobile terminals are being transformed into functional multimedia communication devices.

Also, with developments in communication technology, a function of a messenger program previously only available on a conventional personal computer (PC) is now being provided on mobile terminals, along with a calling service and a text messaging service. Accordingly, there is a need for a method that allows subscribers to connect to a mobile messenger server, and chat with each other more conveniently.

A conventional conversational messaging service may provide a group chat that enables a plurality of users to converse with one another. Since multiple users are on a receiving end of a message in the group chat, displaying detailed information on the receiving end for each message in the group chat is required.

DISCLOSURE OF INVENTION

Technical Goals

An aspect of the present invention provides a method of operating a conversational messaging service for providing confirmation of receipt that selects a number of users failing to read each of messages, based on an identification number of messages read most recently by the users in a group chat.

More particularly, another aspect of the present invention provides a method of operating a conversational messaging service for providing confirmation of receipt that selects an identification number of a message transmitted most recently by users in a group chat and/or a message received most recently by the users as a watermark, and determines a number of users failing to read each of the messages based on the watermark.

Technical Solutions

According to an aspect of the present invention, there is provided a method of operating a conversational messaging service, the method including assigning an identification number to messages transmitted by users participating in a group chat, sequentially, selecting an identification number of any one of messages associated with each of the users as a watermark for each of the users, and determining a number of users failing to read each of the messages, based on the watermark selected for the each of the users.

The selecting of the identification number of any one of messages associated with each of the users as the watermark of each of the users may include selecting an identification number of a message read most recently by the each of the users as a watermark.

The selecting of the identification number of any one of the messages associated with each of the users as the watermark for each of the users may include comparing the watermark selected for each of the users and the identification numbers of the messages.

The determining of the number of users failing to read each of the messages associated with each of the users may include determining a number of users corresponding to a watermark having a number smaller than the identification number selected for each of the messages as the number of users failing to read each of the messages.

The selecting of the identification number of the message read most recently by each of the users as the watermark may include updating an identification number assigned to a message transmitted by a certain user to a watermark of the certain user when the certain user transmits the message.

The selecting of the identification number of the message read most recently by each of the users as the watermark may include updating a greatest identification number among identification numbers assigned to the at least one message received by a certain user to a watermark of the certain user when the certain user receives the at least one message.

The method of operating the conversational messaging service may further include displaying the number of users failing to read each of the messages.

The displaying of the number of users failing to read each of the messages each may include displaying the number of users failing to read each of the messages as a number or a symbol in a periphery of an area in which each of the messages is displayed.

The method of operating the conversational messaging service may further include determining at least one of a number of users reading each of the messages, and an identifier (ID) of each of the users reading or failing to read each of the messages, and a username of users reading or failing to read each of the messages.

According to an aspect of the present invention, there is provided a server system, including an identification processing unit to assign an identification number to messages transmitted by users participating in a group chat, sequentially, a watermark selecting unit to select an identification number of any one of messages associated with each of the users, and a received information determining unit to determine a number of users failing to read each of the messages based on a watermark selected for each of the users.

The watermark selecting unit may select an identification number of a message read most recently by the users as a watermark.

The received information determining unit may select a number of users corresponding to a watermark having a number smaller than an identification number selected for each of the messages as the number of users failing to read each of the messages.

When a certain user transmits a message, the watermark selecting unit may update the identification number assigned to a message transmitted by the certain user to a watermark, and update a greatest number among identification numbers assigned to the at least one message received by the certain user to a watermark of the certain user.

The received information determining unit may determine at least one of a number of users reading each of the messages, an identification of users reading or failing to read each of the messages, and a username for each of the users reading or failing to read each of the messages, based on the selected watermark.

According to an aspect of the present invention, there is provided a mobile terminal that comprises a key inputting unit and a displaying unit, including a memory to store a chat application provided with a conversational messaging service from a server system, and a controller to control participation in the group chat with at least one user through transmitting and receiving messages with the server system in response to the chat application being executed, and the chat application may include an identification number obtaining module to obtain an identification number corresponding to a message transmitted or received by the controller, a watermark obtaining module to obtain a watermark corresponding to at least one user participating in the group chat from the server system, and a reception determination processing module to compare the identification number obtained by the identification obtaining module, and to determine a number of users failing to read a message transmitted or received by the controller.

BEST MODE FOR CARRYING OUT THE INVENTION

Figure 1:
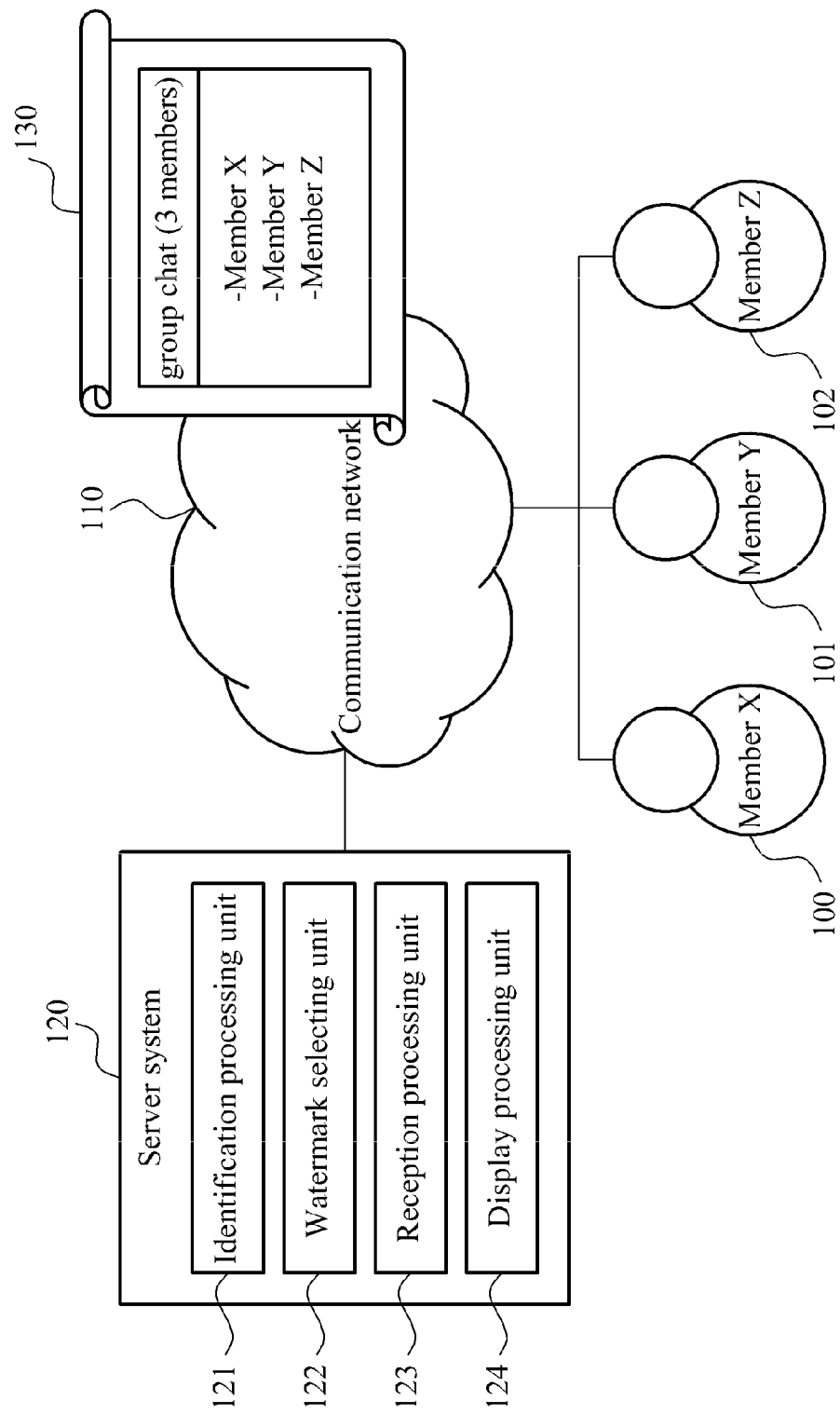
FIG. 1 is a diagram illustrating a system configuration of a method of operating a conversational messaging service according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a system configuration of a method of operating a conversational messaging service according to an embodiment of the present invention.

Referring to FIG. 1, each of users participating in a group chat may be referred to as a member X 100, a member Y 101, and a member Z 102. Each member may connect to a server system 120 for providing a conversational messaging service via a communication network 110. Accordingly, the member X 100, the member Y 101, and the member Z 102 may form a single group chat as shown in 130.

The server system 120 may receive a message transmitted by a member in the group chat, and transmit the message to other members. Also, these messages may be delivered to a chatting application of a mobile terminal carried by each of the members. The chatting application may display a message received from the server system 120 and a message transmitted to the server system 120 on a screen in a form of a conversation, and create a new message in response to an input of a user.

The chatting application may further display information indicating how many users read a message transmitted by a user and messages transmitted by other users.

The server system 120 may read such information according to an embodiment of the present invention. The server system 120 may assign an identification number to each of the messages sequentially, and determine whether each of the messages are read by selecting an identification number corresponding to a message read recently by each of the members as a watermark for each of the members.

The server system 120 may include an identification processing unit 121, a watermark selecting unit 122, a receiving information determining unit 123, and a display processing unit 124.

The identification processing unit 121 may assign an identification number to each of the messages transmitted by members participating in a group chat, sequentially.

The watermark selecting unit 122 may select any one of the messages associated with each of the members as a watermark for each of the members. That is, the watermark selecting unit 122 may select an identification number of a message read most recently by each of the members as the watermark of each of the members.

The receiving information determining unit 123 may determine a number of users failing to read each of the messages, based on the watermark selected by the watermark selecting unit 122.

More particularly, the receiving information determining unit 123 may select a number of watermarks smaller than the identification number for each of the messages among selected watermarks as a number of users failing to read each of the messages.

The display processing unit 124 may display a number of users failing to read each of the messages along with each of the messages.

Figure 2:
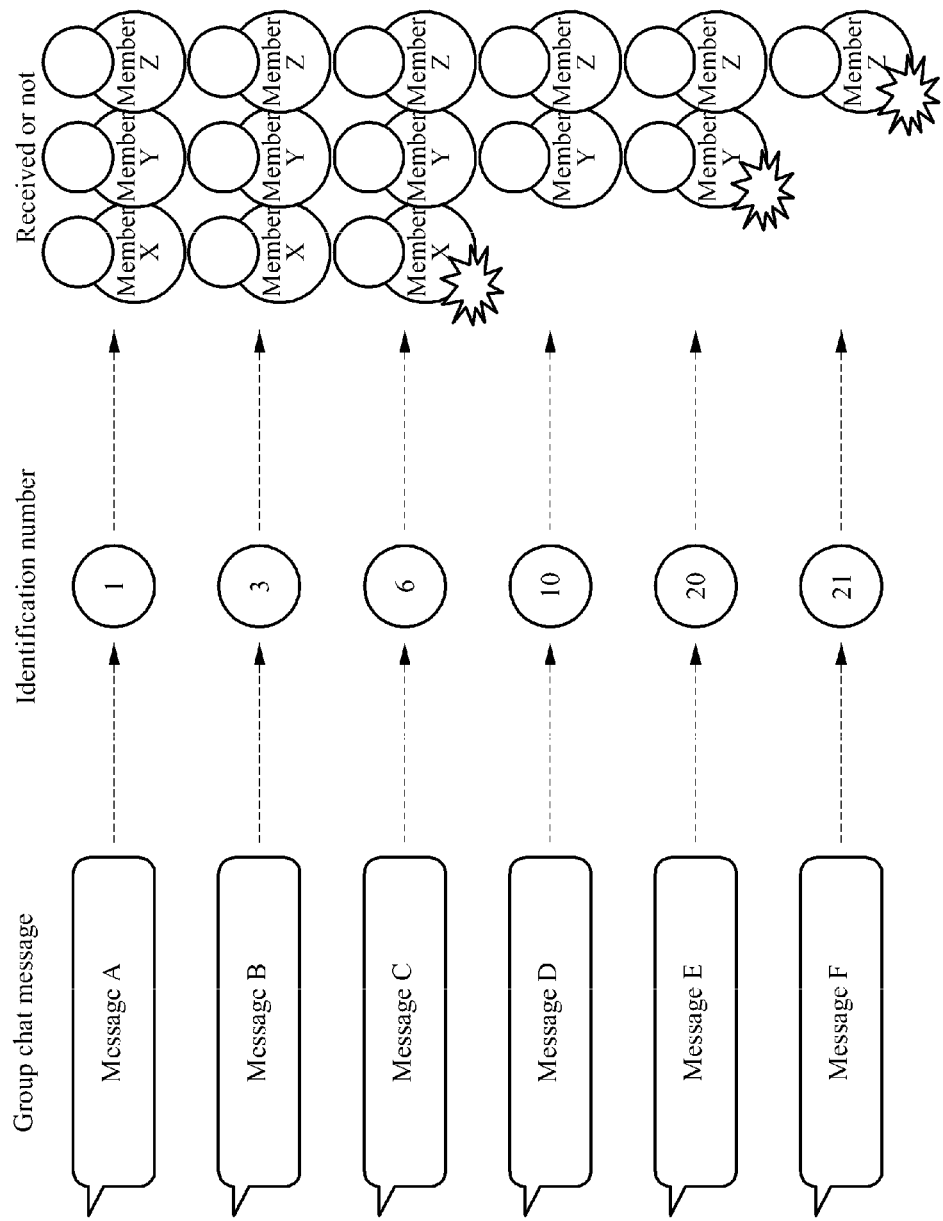
FIG. 2 is a diagram illustrating an example of a process in which the server system of FIG. 1 processes messages.

FIG. 2 is a diagram illustrating an example of a process in which the server system of FIG. 1 processes messages.

Referring to FIG. 2, the server system 120 may receive messages A to F from other members of the chat. Also, the server system 120 may assign an identification number sequentially when each of the messages A to F is received. Accordingly, identification numbers 1, 3, 6, 10, 20, and 21 may be assigned to the messages A to F.

Subsequently, the server system 120 may transmit messages that have been received at the time, to each of members when a chat application installed in a mobile terminal of the members is connected.

Since the members may be able to adjust the chatting application at different points in time, a number assigned to each of the messages provided by the server system 120 may differ from one another.

For example, the member X 100 may receive the messages A to C as the member X 100 is connected to the server system 120 at a point in time 1, the member Y 101 may receive the messages A to E as the member Y 101 is connected to the server system 120 at a point in time 2, and the member Z 103 may receive the messages A to F as the member Z 103 is connected to the server system 120 at a point in time 3.

In such a reception process, the watermark selecting unit 122 may select an identification number of a message read most recently by each of the members as a watermark for each of the members. Accordingly, the watermark selecting unit 122 may select a watermark associated with the member X 100 as "6", a watermark associated with the member Y 101 as "20", and a watermark associated with the member Z 103 as "21".

Figure 3:
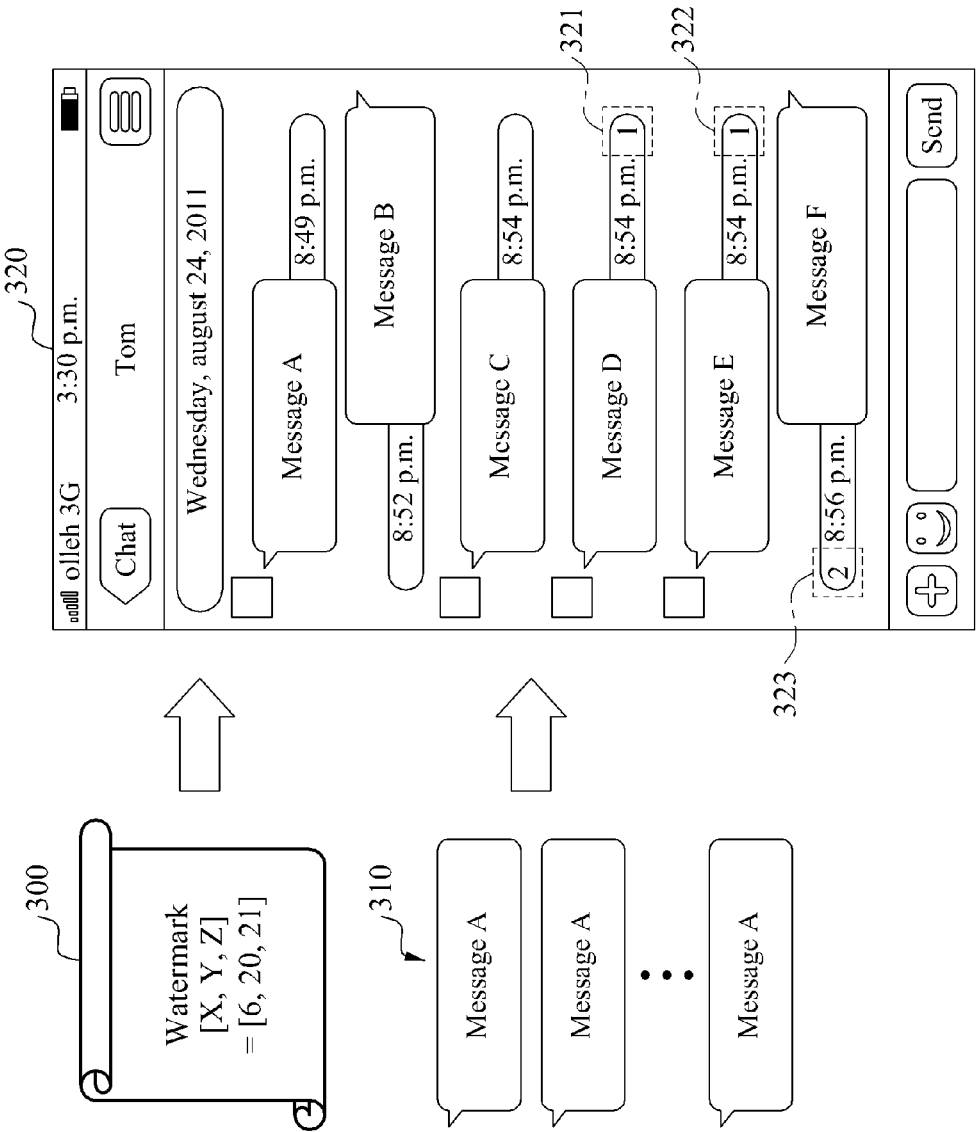
FIG. 3 is a diagram illustrating an example in which messages processed by the server system of FIG. 1 are displayed on a screen.

FIG. 3 is a diagram illustrating an example in which messages processed by the server system of FIG. 1 are displayed on a screen. The watermark selecting unit 122 may configure a watermark associated with each of the members as shown in 300.

A chatting application may configure a group chat screen of members upon reception of messages 310 from the server system 120 as shown in 320.

Here, the server system 120 or the chatting application 120 may select a number of users failing to read each of the messages, based on the watermark 300.

According to an embodiment of the present invention, since the server system 120 selects the number of the users failing to read each of the messages directly, a description pertaining to the chatting application selecting the number of the users failing to read each of the messages will be set forth additionally. The receiving information determining unit 123 of the server system 120 may select a number of watermarks smaller than an identification number of each of the messages among watermarks as a number of users failing to read each of the messages.

That is, watermarks corresponding to members [X, Y, Z] may be [6, 20, 21]. Here, since an identification number of a message A is "1" and a number of watermarks smaller than "1" is zero, a number of users failing to read the message A may be zero.

Transitively, messages B and C may correspond to the case of the message A.

Since an identification number of a message D is "10" and a number of watermarks smaller than "10" is one, that is, "6", a number of users failing to read the message D may be one. Transitively a message E may correspond to the case of the message D.

Since an identification number of a message F is "21" and a number of watermarks smaller than "21" is two, that is, "5" and "20", a number of users failing to read the message F may be two.

The receiving information determining unit 123 may deliver the number of users failing to read each of the messages determined as above when the chatting application is connected to the server system 120. The delivered information may be displayed as on a screen of 320. That is, the chatting application may display a number of users 321 to 323 failing to read each of the messages while displaying a message received from the server system 120 and a message transmitted by the chatting application on the screen, sequentially.

Figure 4:
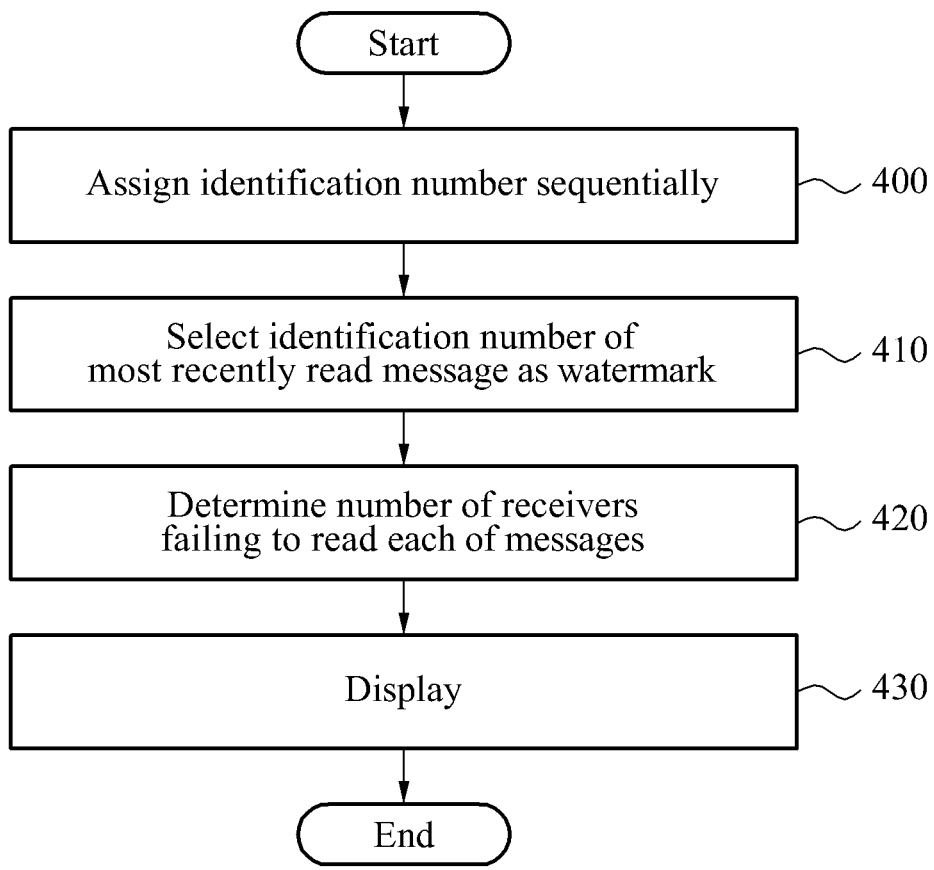
FIG. 4 is a diagram illustrating a method of operating a conversational messaging service according to another embodiment of the present invention.

FIG. 4 is a diagram illustrating a method of operating a conversational messaging service according to another embodiment of the present invention. The method of operating the conversational messaging service for providing the confirmation of receipt may be operated by a server system.

Referring to FIG. 4, in operation 400, the server system may assign an identification number to messages transmitted by users participating in a group chat, sequentially.

In operation 410, the server system may select identification numbers of messages read most recently by each of users as watermarks.

In operation 420, the server system may determine a number of users failing to read each of the messages, based on the selected watermarks. To proceed with operation 420, the server system may select a number of watermarks smaller than an identification number for each of the messages among the watermarks as a number of users failing to read each of the messages.

Figure 5:
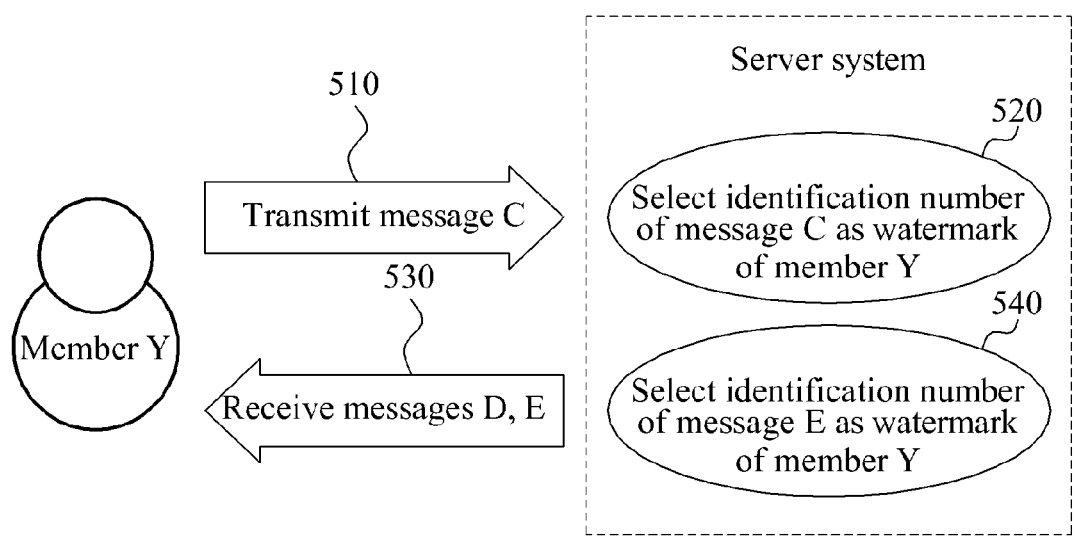
FIG. 5 is a diagram illustrating a process in which a watermark is updated in a method of operating a conversational messaging service according to another embodiment of the present invention.

In operation 430, the server system may display the determined number of users failing to read each of the messages along with the messages. Further, the server system may re-select a watermark with respect to an identification number read most recently by each of the users when a new transmitting message or a receiving message occurs. Such a process may be described with reference to FIG. 5.

The server system may detect a certain user transmitting a message, and update an identification number assigned to the message to a watermark of the certain user.

For example, when a member Y transmits a message C to the server system as shown in 510, the server system may select an identification number of the message C "6" as a watermark of the member Y. Moreover, when the member Y further transmits another message, the server system may re-select an identification number of another message additionally transmitted as a watermark of the member Y.

Also, the server system may detect a certain user receiving a certain message, and update an identification number assigned to the received message to a watermark of the certain user. When the certain user receives a plurality of messages all at once, the server system may update a greatest number among identification numbers of the received plurality of messages to a watermark associated with the certain user.

That is, when the member Y receives messages D and E from the server system as in 530, the server system may select a greatest number "20" among identification numbers of the messages D and E "10" and "20" as a watermark of the member Y.

According to an embodiment of the present invention, the server system 120 may select a number of users failing to read messages directly, however, the chatting application may select the number of the users failing to read the messages in another embodiment of the present invention. That is, the server system may perform assigning an identification number of a message and selecting a watermark only, and subsequently, selecting a number of users failing to read each of the messages may be performed by the chatting application.

Accordingly, the chatting application may receive information associated with each of the messages, identification numbers for each of the messages, and watermarks, and may directly select a number of users failing read each of the messages when configuring a group chat screen.

To this end, the chatting application may be a program installed in a memory of a mobile terminal. Here, the mobile terminal may indicate various computing terminals, and conventionally, examples of the mobile terminal may include a mobile phone, a smart phone, a laptop, a tablet computing device, a personal digital assistant (PDA), and the like. In general, although not shown illustrated, the mobile terminal may include a key inputting unit, a displaying unit, a communication unit, a memory, and a controller. The memory may install the aforementioned chatting application and the controller may implement the chatting application in response to a key input by a user. More particularly, the controller may participate in a group chat with other users through transmitting/receiving a message with the server system 120.

Figure 6:
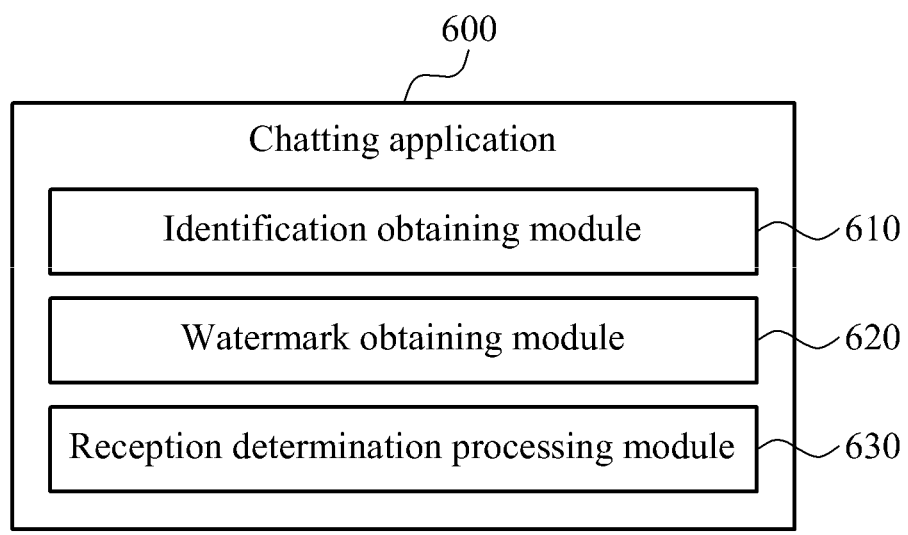
FIG. 6 is a diagram illustrating a configuration of a chatting application of a mobile terminal to which a method of operating a conversational messaging service may be applied according to still another embodiment of the present invention.

The chatting application may include a configuration as shown in FIG. 6. Referring to FIG. 6, the chatting application 600 may include an identification obtaining module 610, a watermark obtaining module 620, and a reception determination processing module 630. In this instance, the server system in conjunction with the chatting application 600 may include other configurations 121 to 124 among configurations of the server system 120 shown in FIG. 1 aside from the receiving information determining unit 123.

The identification obtaining module 610 of the chatting application 600 may obtain an identification number corresponding to a message transmitted by a controller of a mobile terminal and a message received from the server system. That is, the identification obtaining module 610 may obtain identification numbers [1, 3, 6, 10, 20, 21] corresponding to messages A to F respectively.

The watermark obtaining module 620 may obtain a watermark corresponding to users participating in the group chat from the server system. That is, the watermark obtaining module 620 may obtain watermarks [6, 20, 21] corresponding to members [X, Y, Z].

The reception determination processing module 630 may compare an identification number obtained by the identification number obtaining module 610 and a watermark, and determine a number of users failing to read a message transmitted or received by the controller.

That is, the reception determination processing module 630 may determine a number of watermarks smaller than an identification number for each of the messages among watermarks to be a number of users failing to read each of the messages.

Here, the reception determination processing module 630 may exclude a watermark corresponding to the reception determination processing module 630 when determining a number of watermarks.

Also, the reception determination processing module 630 may fail to operate in correspondence with each of the messages, and operate until a number of users failing to read a message reaches zero with respect to a message newly transmitted to the server system and a message newly received by the server system.

Also, the watermark obtaining module 620 may obtain a watermark corresponding to users participating in the group chat from the server system at regular intervals or when a newly transmitted or received message occurs.

According to embodiments of the present invention, there is provided a server system that selects and displays, rapidly, a number of users failing to read each of messages transmitted or received by the users in a group chat. Also, according to another embodiment of the present invention, it is possible to provide an application that selects rapidly a number of users failing to read each of messages in a group chat.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of operating a conversational messaging service, the method comprising:
    assigning sequentially an identification number to each message transmitted by users participating in a group chat;
    selecting an identification number of any one of the messages associated with each of the users as a watermark of each of the users; and
    determining a number of users failing to read each of the messages associated with each of the users or a number of users reading each of the messages associated with each of the users, based on the watermark selected for each of the users,
    wherein the determining of the number of users failing to read each of the messages associated with each of the users the number of users reading each of the messages associated with each of the users comprises:
    determining a number of users corresponding to a watermark having a number smaller than the identification number selected for each of the messages as the number of users failing to read each of the messages; or
    determining a number of users corresponding to a watermark having a number not smaller than the identification number selected for each of the messages as the number of users reading each of the messages, and
    the method further comprises displaying the number of users failing to read each of the messages or the number of users reading each of the messages.

2. The method of claim 1, wherein the selecting of the identification number of any one of messages associated with each of the users as the watermark for each of the users comprises:
    selecting an identification number of a message read most recently by the each of the users as the watermark.

3. The method of claim 1, wherein the selecting of the identification number of any one of messages associated with each of the users as the watermark for each of the users comprises:
    comparing the watermark selected for each of the users and the identification numbers of the messages.

4. The method of claim 2, wherein the selecting of the identification number of the message read most recently by each of the users as the watermark comprises:
    updating an identification number assigned to a message transmitted by a certain user to a watermark of the certain user when the certain user transmits the message.

5. The method of claim 2, wherein the selecting of the identification number of the message read most recently by each of the users as the watermark comprises:
    updating a greatest identification number among identification numbers assigned to the at least one message received by a certain user to a watermark of the certain user when the certain user receives the at least one message.

6. The method of claim 5, wherein the displaying of the number of users failing to read a message or the number of users reading a message comprises:
    displaying the number of users failing to read each of the messages or the number of users reading each of the messages as a number or a symbol in a periphery of an area in which each of the messages is displayed.

7. The method of claim 1, further comprising:
    determining at least one of an identifier (ID) of each of the users reading each of the messages or failing to read each of the messages, and a username of users reading each of the messages or failing to read each of the messages.

8. A server system, comprising:
    a processor configured to:
    assign sequentially an identification number to each message transmitted by users participating in a group chat;
    select an identification number of any one of the messages associated with each of the users as a watermark of each of the users;
    determine a number of users failing to read each of the messages associated with each of the users or a number of users reading each of the messages associated with each of the users based on the watermark selected for each of the users;
    select a number of users corresponding to a watermark having a number smaller than an identification number assigned for each of the messages as the number of users failing to read each of the messages or select a number of users corresponding to a watermark having a number not smaller than an identification number assigned for each of the messages as the number of users reading each of the messages; and display the number of users failing to read each of the messages or the number of users reading each of the messages.

9. The server system of claim 8, wherein the processor is configured to select an identification number of a message read most recently by each of the users as a watermark.

10. The server system of claim 8, wherein when a certain user transmits a message, the processor is configured to:
update the identification number assigned to the message transmitted by the certain user to a watermark, and
update a greatest number among identification numbers assigned to the at least one message received by the certain user to a watermark of the certain user.

11. The server system of claim 8, wherein the processor is configured to determine at least one of an identification of users reading each of the messages or failing to read each of the messages, and a username for each of the users reading each of the messages or failing to read each of the messages, based on the selected watermark.

12. A mobile terminal that comprises a key inputting unit and a displaying unit, comprising:
a memory to store a chat application provided with a messaging service from a server system; and
a controller configured to control participating in the group chat with at least one user through transmitting and receiving messages with the server system in response to the chat application being executed,
wherein the controller is configured to:
obtain an identification number corresponding to a message transmitted or received by the controller;
obtain a watermark corresponding to at least one user participating in the group chat from the server system; and
compare the identification number obtained by the identification obtaining module, and to determine, based on a watermark corresponding to each of users participating in the group chat, a number of users failing to read a message associated with each of the users or a number of users reading a message associated with each of the users transmitted or received by the controller,
wherein the controller is configured to:
select a number of users corresponding to a watermark having a number smaller than an identification number assigned for each of the messages as the number of users failing to read each of the messages; or
select a number of users corresponding to a watermark having a number not smaller than an identification number assigned for each of the messages as the number of users reading each of the messages,
wherein the displaying unit is configured to display the number of users failing to read each of the messages or the number of users reading each of the messages.

* * * * *